United States Patent
Votel et al.

(10) Patent No.: US 10,021,958 B2
(45) Date of Patent: Jul. 17, 2018

(54) TOOL SAFETY STRAP

(71) Applicant: Tenacious Holdings, Inc., St. Paul, MN (US)

(72) Inventors: Thomas Votel, Sunfish Lake, MN (US); Nate Bohmbach, Burnsville, MN (US)

(73) Assignee: Tenacious Holdings, Inc., St. Paul, MN (US)

( * ) Notice: Subject to any disclaimer, the term of this patent is extended or adjusted under 35 U.S.C. 154(b) by 883 days.

(21) Appl. No.: 14/020,929

(22) Filed: Sep. 9, 2013

(65) Prior Publication Data

US 2014/0196258 A1    Jul. 17, 2014

Related U.S. Application Data

(60) Provisional application No. 61/751,990, filed on Jan. 14, 2013.

(51) Int. Cl.
| | |
|---|---|
| *A45F 5/14* | (2006.01) |
| *B23P 11/02* | (2006.01) |
| *A45F 5/00* | (2006.01) |
| *A45C 13/30* | (2006.01) |

(52) U.S. Cl.
CPC ............... *A45F 5/14* (2013.01); *A45F 5/00* (2013.01); *B23P 11/02* (2013.01); *A45C 2013/303* (2013.01); *A45F 2005/006* (2013.01); *A45F 2200/0575* (2013.01); *Y10T 24/47* (2015.01); *Y10T 29/4987* (2015.01)

(58) Field of Classification Search
CPC ............ A45F 5/00; A45F 2005/006; A45F 2005/008; A45F 2005/002; A45F 2005/1006; A45F 2005/1013; A45F 2005/102; A45F 2005/1066; A45F 2005/1073; A45F 2200/0575; Y10T 29/49863; Y10T 29/4987; Y10T 29/49865; Y10T 29/53657
See application file for complete search history.

(56) References Cited

U.S. PATENT DOCUMENTS

| | | | | |
|---|---|---|---|---|
| 3,515,798 | A | * | 6/1970 | Sievert ........................ 174/135 |
| 3,808,352 | A | * | 4/1974 | Johnson ...................... 174/73.1 |
| 3,993,109 | A | | 11/1976 | Fortsch |

(Continued)

FOREIGN PATENT DOCUMENTS

| | | |
|---|---|---|
| CH | 672236 A5 | 11/1989 |
| EP | 291203 A2 * | 11/1988 ............. H02G 15/18 |

OTHER PUBLICATIONS

3M Low Voltage Cold Shrink brochure; 1998; 8 pages.

(Continued)

*Primary Examiner* — David Bryant
(74) *Attorney, Agent, or Firm* — Skaar Ulbrich Macari, P.A.

(57) ABSTRACT

A novel way of attaching a safety strap to a hand tool where the hand tool does not have a readily available means of connecting such a strap. In one aspect of the disclosure, a rubber sleeve is stretched over a removable core that is then placed over the hand tool and the safety strap such that the strap is between the sleeve and an anchor surface. The rubber sleeve is then released from the core, and the safety strap is held securely by the constricting rubber sleeve.

2 Claims, 8 Drawing Sheets

(56) References Cited

U.S. PATENT DOCUMENTS

| | | | |
|---|---|---|---|
| 4,020,985 A * | 5/1977 | Halterman | 224/251 |
| 4,051,584 A | 10/1977 | Huser | |
| 4,321,952 A | 3/1982 | Natkins | |
| 4,389,440 A * | 6/1983 | Keith | 428/34.9 |
| 4,503,105 A * | 3/1985 | Tomioka | 428/36.9 |
| 4,508,221 A | 4/1985 | Olson | |
| 4,515,423 A | 5/1985 | Moore et al. | |
| 4,606,484 A | 8/1986 | Winter et al. | |
| 4,828,154 A | 5/1989 | Clifton, Jr. | |
| 4,860,617 A | 8/1989 | Robbins | |
| 4,860,618 A | 8/1989 | Givot | |
| 4,871,599 A * | 10/1989 | Knorr | 428/36.9 |
| 4,944,747 A | 7/1990 | Newth et al. | |
| 5,056,661 A | 10/1991 | Balzano | |
| 5,082,156 A | 1/1992 | Braun | |
| 5,087,492 A * | 2/1992 | Vallauri et al. | 428/34.9 |
| 5,098,752 A * | 3/1992 | Chang et al. | 428/34.9 |
| 5,163,600 A | 11/1992 | Barbarich et al. | |
| 5,261,581 A | 11/1993 | Harden, Sr. | |
| 5,275,068 A | 1/1994 | Wrench | |
| 5,373,616 A * | 12/1994 | Biersdorf et al. | 29/235 |
| 5,380,393 A | 1/1995 | Drabarek et al. | |
| 5,433,359 A | 7/1995 | Flowers | |
| 5,577,785 A | 11/1996 | Traber et al. | |
| 5,593,460 A | 1/1997 | Lessard | |
| 5,658,258 A | 8/1997 | Kneer et al. | |
| 5,733,195 A * | 3/1998 | Wall | 463/47.2 |
| 5,738,152 A | 4/1998 | Crittenden | |
| 5,800,886 A * | 9/1998 | Vallauri et al. | 428/35.8 |
| 5,913,464 A | 6/1999 | Haeberlein | |
| 5,938,532 A * | 8/1999 | Wall | 463/47.2 |
| 5,944,929 A * | 8/1999 | Vallauri et al. | 156/162 |
| 6,021,783 A | 2/2000 | Phillips | |
| 6,029,321 A | 2/2000 | Fisher | |
| 6,082,468 A | 7/2000 | Pusateri et al. | |
| 6,105,470 A | 8/2000 | Hutchins | |
| 6,113,565 A * | 9/2000 | Schlup et al. | 602/62 |
| 6,155,354 A | 12/2000 | Pusateri et al. | |
| 6,216,319 B1 | 4/2001 | Elkins | |
| 6,217,762 B1 | 4/2001 | Rooney et al. | |
| 6,338,375 B1 | 1/2002 | Harada | |
| 6,360,928 B1 | 3/2002 | Russo | |
| 6,378,716 B1 * | 4/2002 | Gzybowski et al. | 215/364 |
| 6,397,711 B1 | 6/2002 | Marek | |
| 6,402,002 B1 | 6/2002 | Benton | |
| 6,415,936 B1 * | 7/2002 | Gzybowski et al. | 215/364 |
| 6,467,638 B2 * | 10/2002 | Gzybowski et al. | 215/364 |
| 6,487,756 B1 | 12/2002 | Vidal et al. | |
| 6,641,011 B1 | 11/2003 | Kahn | |
| 6,651,856 B1 * | 11/2003 | Perry | 224/604 |
| 6,820,906 B1 | 11/2004 | McClendon | |
| 6,988,647 B2 * | 1/2006 | Perry | 224/604 |
| 6,988,939 B2 | 1/2006 | Hofmann et al. | |
| 7,032,482 B1 | 4/2006 | Hoffman | |
| 7,111,528 B1 | 9/2006 | Foster | |
| 7,168,331 B1 | 1/2007 | Bernard et al. | |
| 7,186,909 B2 | 3/2007 | Bee, Jr. et al. | |
| 7,261,349 B1 | 8/2007 | Gregor | |
| 7,265,293 B2 * | 9/2007 | Kamel et al. | 174/69 |
| 7,536,925 B2 | 5/2009 | Bernard et al. | |
| 7,997,787 B2 | 8/2011 | Blair | |
| 8,236,007 B2 | 8/2012 | Persson | |
| 8,266,719 B2 | 9/2012 | Duby | |
| 8,359,949 B2 | 1/2013 | Onello et al. | |
| 8,365,340 B2 | 2/2013 | Barstad et al. | |
| 8,403,132 B2 | 3/2013 | Moreau et al. | |
| 8,561,531 B2 | 10/2013 | Rooth et al. | |
| 8,627,549 B2 | 1/2014 | Vernieu | |
| 2002/0145026 A1 * | 10/2002 | Perry | 224/604 |
| 2004/0050892 A1 * | 3/2004 | Oregon | 224/603 |
| 2005/0283952 A1 | 12/2005 | Talbot et al. | |
| 2012/0267403 A1 | 10/2012 | Ward, Jr. | |
| 2014/0013544 A1 * | 1/2014 | Moreau et al. | 24/3.12 |

OTHER PUBLICATIONS

International Search Report and Written Opinion for PCT/US 2014/010258 (dated Apr. 24, 2014), 7 pages.
International Search Report (dated Apr. 24, 2014, Attached); PCT/US 2014/010258.
3M Low Voltage Cold Shrink brochure; 1998.

* cited by examiner

TOOL SAFETY STRAP

CLAIM OF BENEFIT TO PRIOR APPLICATIONS

This application claims the benefit of U.S. Provisional Application No. 61/751,990 filed Jan. 14, 2013; and such application is hereby fully incorporated by reference herein.

FIELD

The present invention relates generally to a safety strap for hand tools. More particularly, the present invention relates to an improved way of attaching a safety strap to a hand tool by using a constricting rubber sleeve.

BACKGROUND

With the increasing expense and weight of power and unpowered hand tools, there came recognition of the penalty associated with dropping such a tool. Power hand tools are often damaged when they are dropped, and falling hand and power hand tools can injure persons and property if dropped from an elevated position.

As a result of these circumstances, attachment devices have been devised to secure hand tools from such a drop. Some tools are manufactured with captive holes to allow the connection of a safety line. Further, lanyards and D-rings have been built into many hand power tools to allow attachment of lines to the tool at one end and a user's body at the other. For example, see U.S. Pat. No. 6,487,756 to Vidal.

Many power and unpowered hand tools, however, have no such means to attach a safety line. As a result various methods have been devised to add a safety line or lanyard to a tool that was not originally so configured.

One method is to tape a safety strap to the handle of such a tool. Python Safety, Inc. makes such a tape called Quick-wrap Tape™ for this purpose. Another method is used by Tool Safety Solutions LTD, and involves placing heat sensitive tape over a section of a safety strap located adjacent the tool handle, and then apply heat to the tape allowing it to shrink and hold the section of strap in place.

A disadvantage of the tape method is that tape can lose its adhesive properties over time. Such loss of adhesion can be accelerated under use in harsh environmental conditions. The degradation of the adhesive property of tape may not be readily apparent, creating uncertainty when the tool safety strap connection might fail. This creates a safety hazard, especially when using tape to secure heavier tools that are especially dangerous when dropped.

The heat shrink method has disadvantages as well. The heating step might cause heat related damaged to the tool handle and/or the safety strap. If the heat shrink sleeve is over heated, the safety strap, or the heat shrink material itself, might well be weakened by the heating process and such a problem might go undetected. An unexpected failure of the safety strap might then occur. Further, the heating step can release undesirable toxic combustion products. In addition, heat shrink sleeves require use of a thin walled material which is required for optimum rate of heat conduction and process safety of the heat shrink sleeve. Such a thin-walled product may not be durable enough to withstand the weight of a heavy tool, especially under the stress of a dropped tool that is restrained by a safety strap held in place only by the heat shrink sleeve. The thin walled heat shrink material may also not withstand harsh environmental conditions.

Therefore, there is an unfulfilled need for a better and safer way of attaching a safety strap to a hand tool that does not possess a captive hole or built in safety strap.

SUMMARY

The present disclosure is directed to tool safety, particularly an improved way of attaching a safety strap to a hand tool or other object.

This summary is not intended to limit the scope of the invention, or describe each embodiment, implementation, feature or advantage of the invention.

DETAILED DESCRIPTION

Using materials with elastic properties to provide a water tight seal is known to those in the electronic arts. Such a process is described in the application for Canadian patent 2,128,470, which is fully and completely incorporated into this specification by reference. Such a process, however, has a new, novel and unforeseen application as described below.

The advantages of this invention include that it can be used to attach a safety strap to a hand tool that does not have a captive hole or other built in means to attach a safety strap. This invention also has the advantage that a safety strap can be attached to a hand tool without requiring the application of heat or adhesive tape. This invention uses a thick rubber sleeve that provides better support that can safely secure a safety strap on to heavier tools. The thicker material is also more resilient and weather resistant. Further, the eventual failure of adhesive type tape, or a thin heat shrink sleeve, may be avoided. Also, the application of the safety strap to a tool may be made in the field without the requirement of special tools, such as a heat source, for installation. It is also a faster and more efficient means of securing a safety strap to a hand tool.

Figure 1:
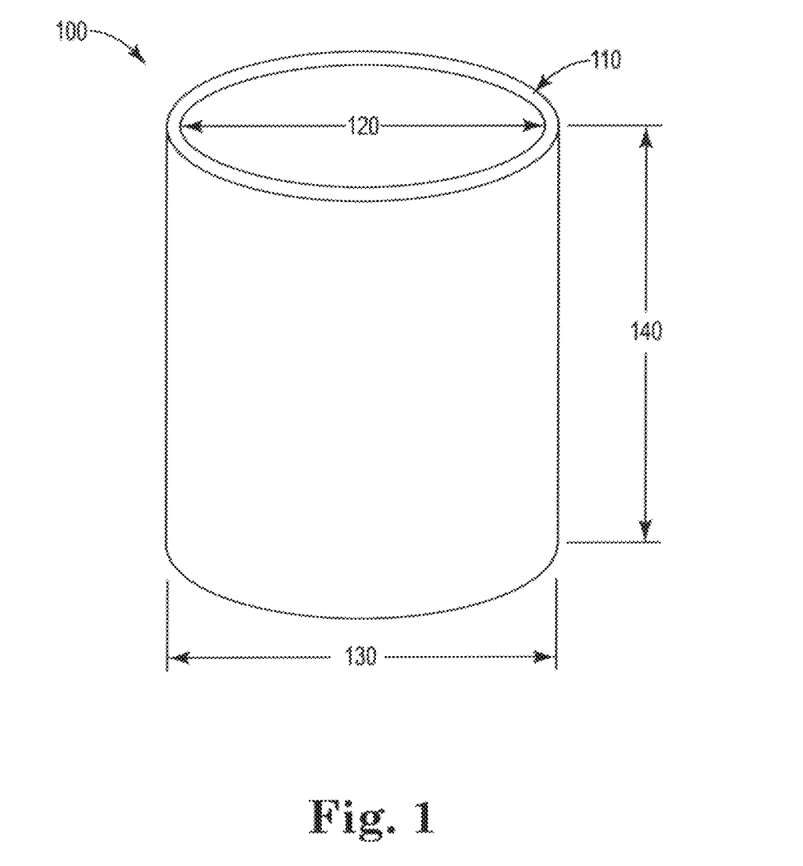
FIG. 1 is a perspective view of elastic sleeve 100.
Figure 2:
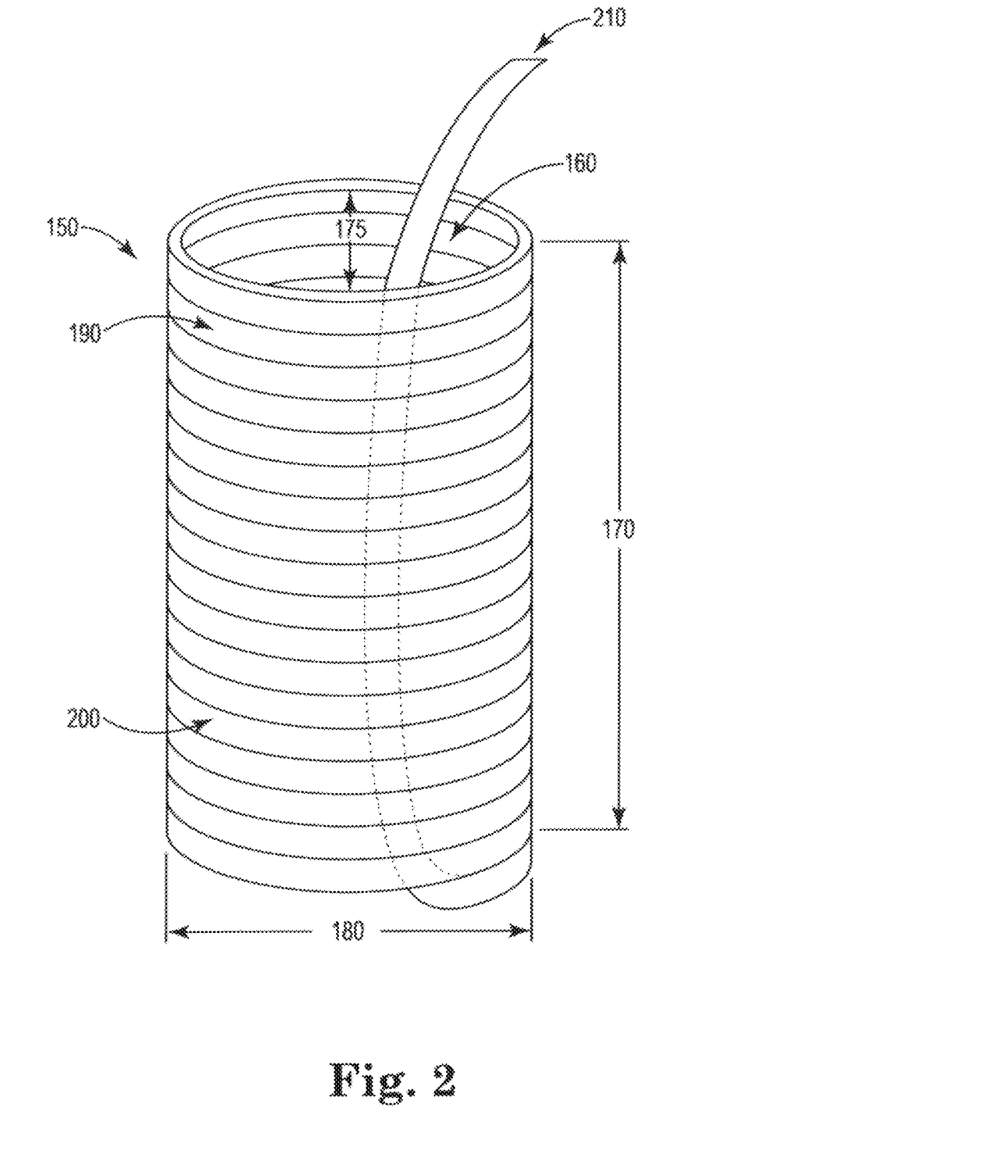
FIG. 2 is a perspective view of removable core 150.
Figure 3:
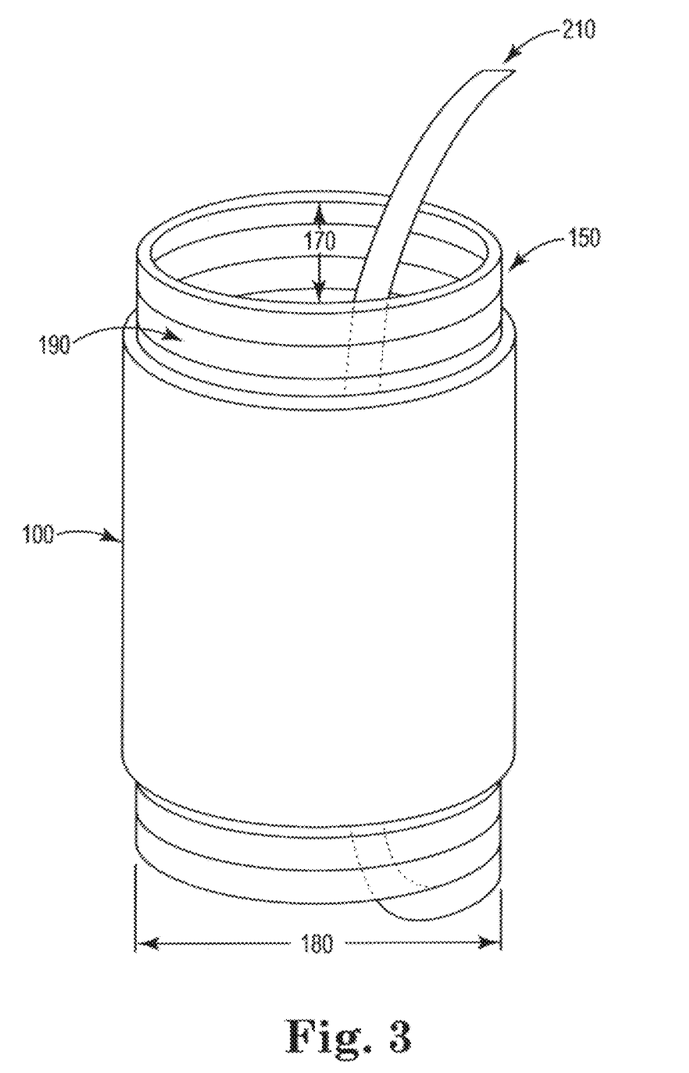
FIG. 3 is a perspective view of elastic sleeve 100 mounted on removable core 150.

Referring to FIGS. 1-3, elastic sleeve 100 of the invention is preferably constructed in open-ended cylindrical sections with lengths and diameters dependent upon the weight and size of the tool to which it will be applied. Elastic sleeve 100 is preferably constructed of rubber or silicone rubber and preferably ethylene propylene diene monomer rubber. An EPDM rubber compound that has a specific gravity between 1.075 and 1.120 is preferred. Using EPDM rubber with this property provides good thermal stability, a tight seal, and years of resiliency and pressure. It also allows for the ease of mounting on removable core 150. Elastic sleeve 100 made from EPDM rubber is also very resistant to fungus, ozone, alkalies and acids. Other elastic materials may also be used.

Elastic sleeve 100 consists of wall width 110 that preferably measures between 0.165 and 0.185 inches in thickness. Elastic sleeve 100 has a relaxed interior diameter 120, a relaxed exterior diameter 130 and a length 140. The length 140 and relaxed interior diameter 120 of elastic sleeve 100 is dependent upon the tool handle exterior diameter and the weight of the tool. For example, a five pound tool with a handle of between 0.75 and 1.5 inches in diameter would preferably use a sleeve of at least three inches in length and a relaxed interior diameter of about 0.5 inches. Such a configuration would allow a tool so equipped to be dropped from six feet and have its fall safely arrested by the safety strap without failure of the connection. It is preferred that the ratio of relaxed interior diameter 120 of elastic sleeve 100 to the exterior diameter of the tool handle is not greater than 0.7, and preferably between 0.3 and 0.67. Tools in the five pound range can be preferably equipped with a sleeve of at least 3 inches in length, whereas a tool in the 15 pound range would preferably use a sleeve of about 6 inches in length. It is preferred that the ratio of sleeve length 140 in inches to the weight of the tool in pounds remain between 0.4 to 0.6.

Removable core 150 is a hollow core cylinder that defines volume 160, and has a length 170, an exterior diameter 180 and an interior diameter 175. Removable core 150 is preferably constructed of a single strand of material 190 connected by perforations 200 at its periphery, and in a spiral fashion, to form removable core 150. Detached strand 210 is preferably fed through volume 160 from its originating attachment to core 150, to the opposite end of core 150. The removal of core 150 is preferably achieved by continuously pulling the detached strand of material 210 through volume 160 thereby continuously unraveling core 150.

Elastic sleeve 100 is stretched and mounted onto removable core 150. It is preferable that the exterior diameter 180 of removable core 150 be 3 to 4 times the relaxed interior diameter 120 of elastic member 100. Such application will allow for an interior diameter 175 that will allow for a broad range of applications onto tool handles with varying exterior diameters. It is also preferable that when elastic member 100 is mounted on removable core 150 that removable core 150 be equal to or longer than length 140 of elastic sleeve 100.

Figure 4:
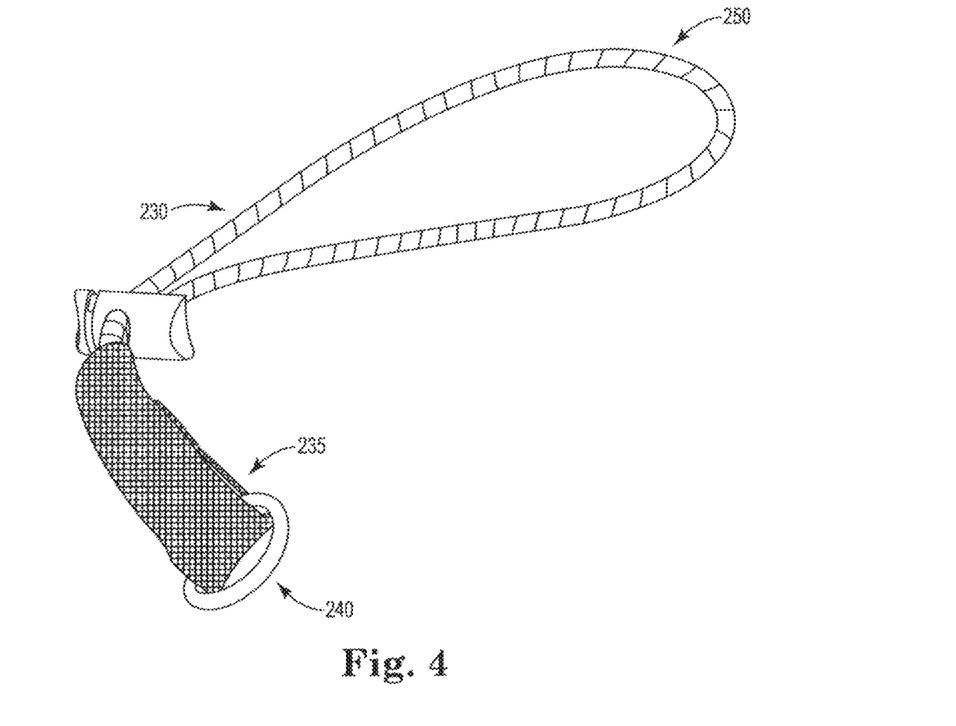
FIG. 4 is a perspective view of safety strap 230.
Figure 5:
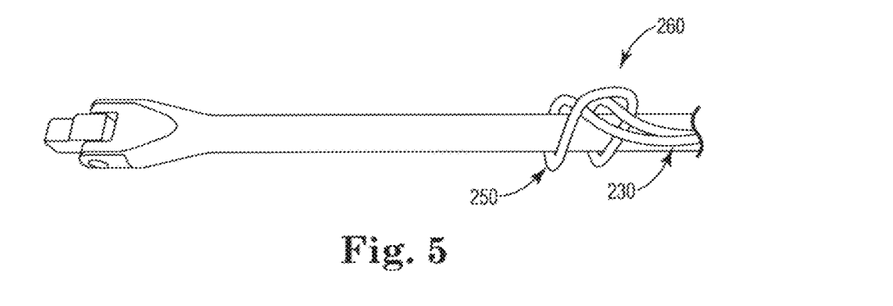
FIG. 5 is a perspective view of safety strap 230 cinched to a hand tool.

Referring to FIGS. 4-5, safety strap 230 is comprised of attachment end 235, which preferably includes D-ring 240, and Tool end 250. D-ring 240 in safety strap 230 can then be used to tether safety strap 230 to a user by means of carabineer or other connection means known to those of skill in the art. Safety strap 230 may also be configured to terminate in a loop of material. Tool end 250 of safety strap 230 is preferably configured to allow safety strap 230 to be attached to the handle of a hand tool by choke type connection 260.

Figure 6:
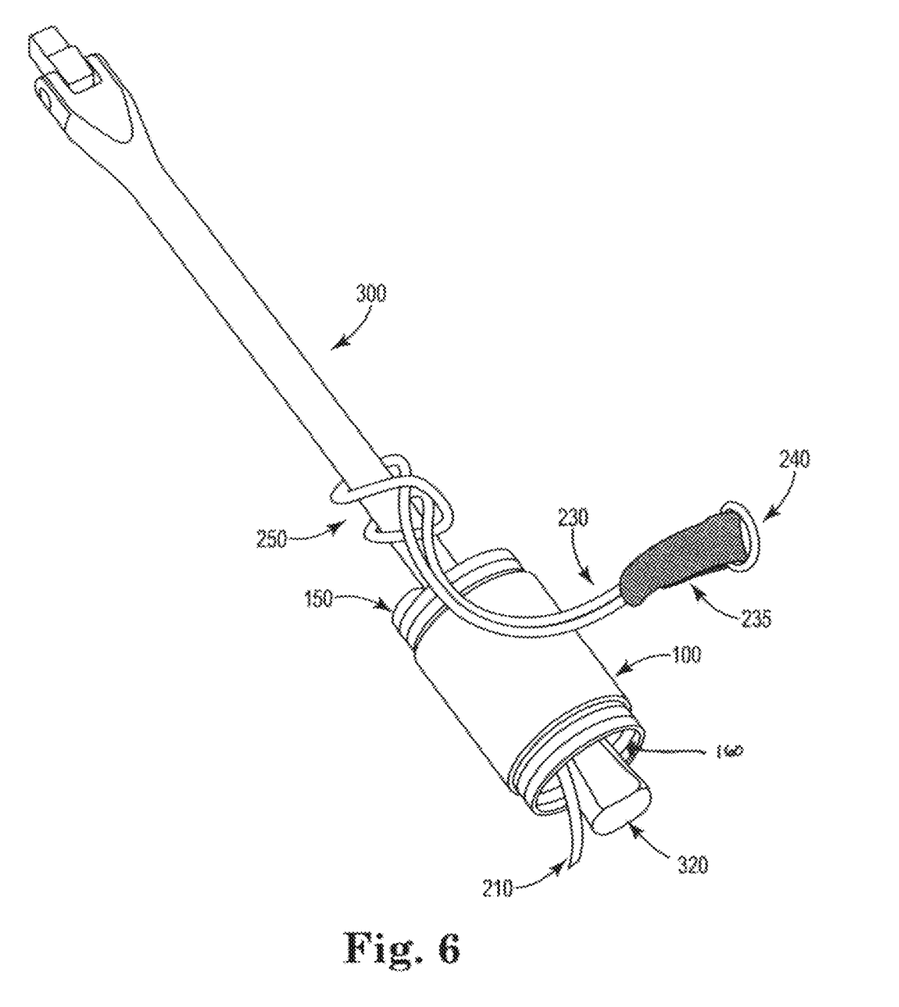
FIG. 6 is a perspective view of a step in the application of the invention to breaker bar 300.
Figure 7:
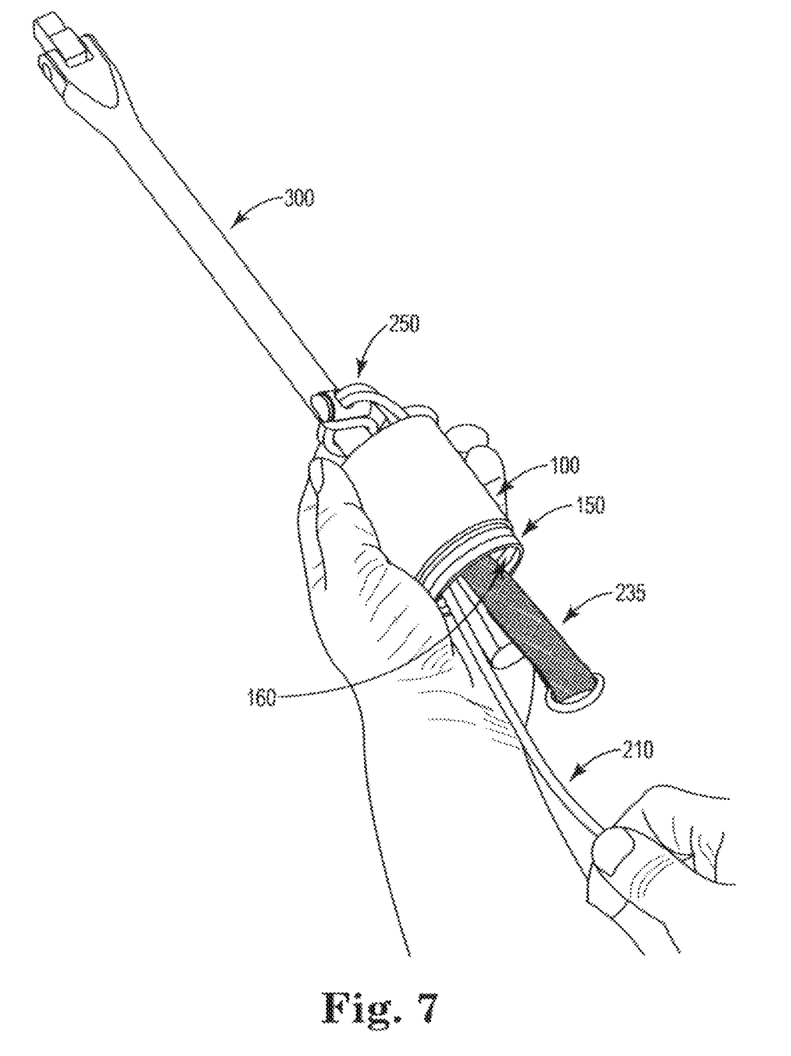
FIG. 7 is a perspective view of a step in the application of the invention to breaker bar 300.

FIGS. 6-9 depict an exemplary application of the invention onto breaker bar 300. Referring to FIG. 6, safety strap 230 is cinched onto breaker bar 300 by cinch knot 250. With elastic sleeve 100 mounted on removable core 150, handle 320 of breaker bar 300 is placed into volume 160 of removable core 150. Detached strand 210 originates on the end of removable core 150 closest to cinch connection 250, and is fed through the length of volume 160 of core 150 such that strand 210 extends from removable core 150 on the opposite end from which it originates. Safety strap 230 is run through volume 160 of core 150 (as shown in FIG. 7) such that it exits core 150 on the same end of core 150 as detached strand 210.

Figure 8:
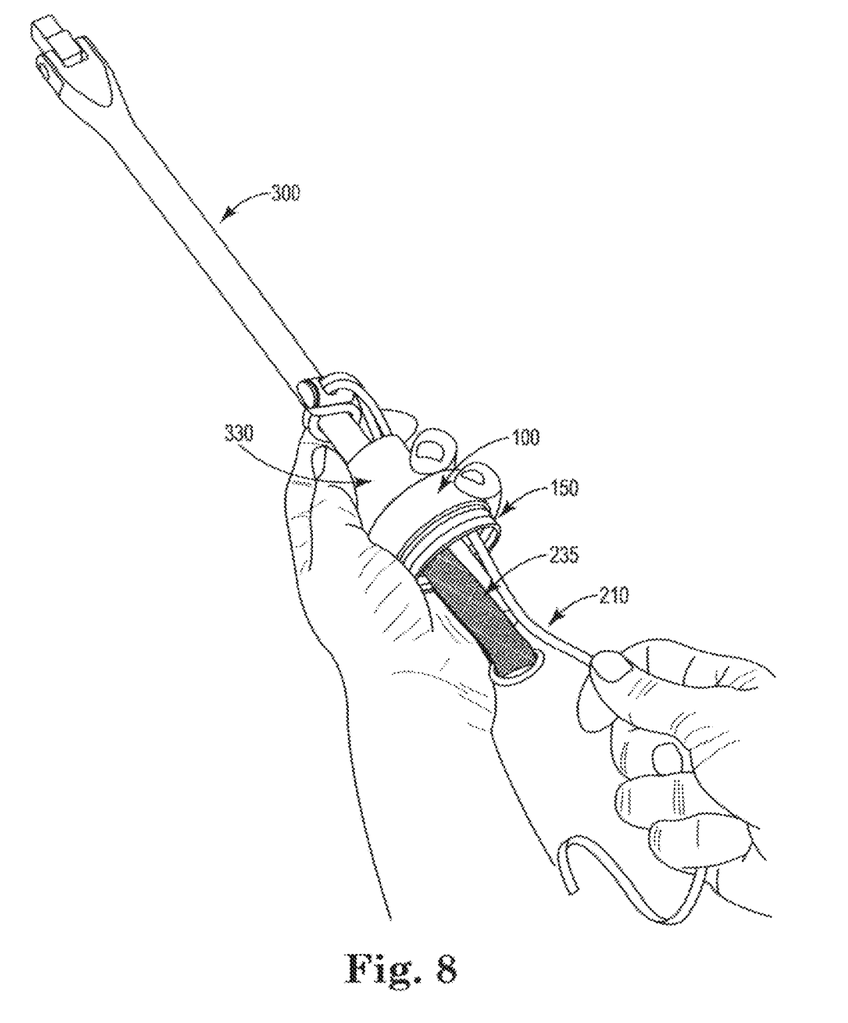
FIG. 8 is a perspective view of a step in the application of the invention to breaker bar 300.

Referring now to FIGS. 7-8, detached strand 210 is continuously pulled through volume 160 of removable core 150 allowing removal of core 150 and the subsequent constriction 330 of elastic sleeve 100. This removal process facilitates the removal of core 150 by allowing strand 210 to remain substantially clear of constricting elastic sleeve 100 during the core 150 removal process.

Figure 9:
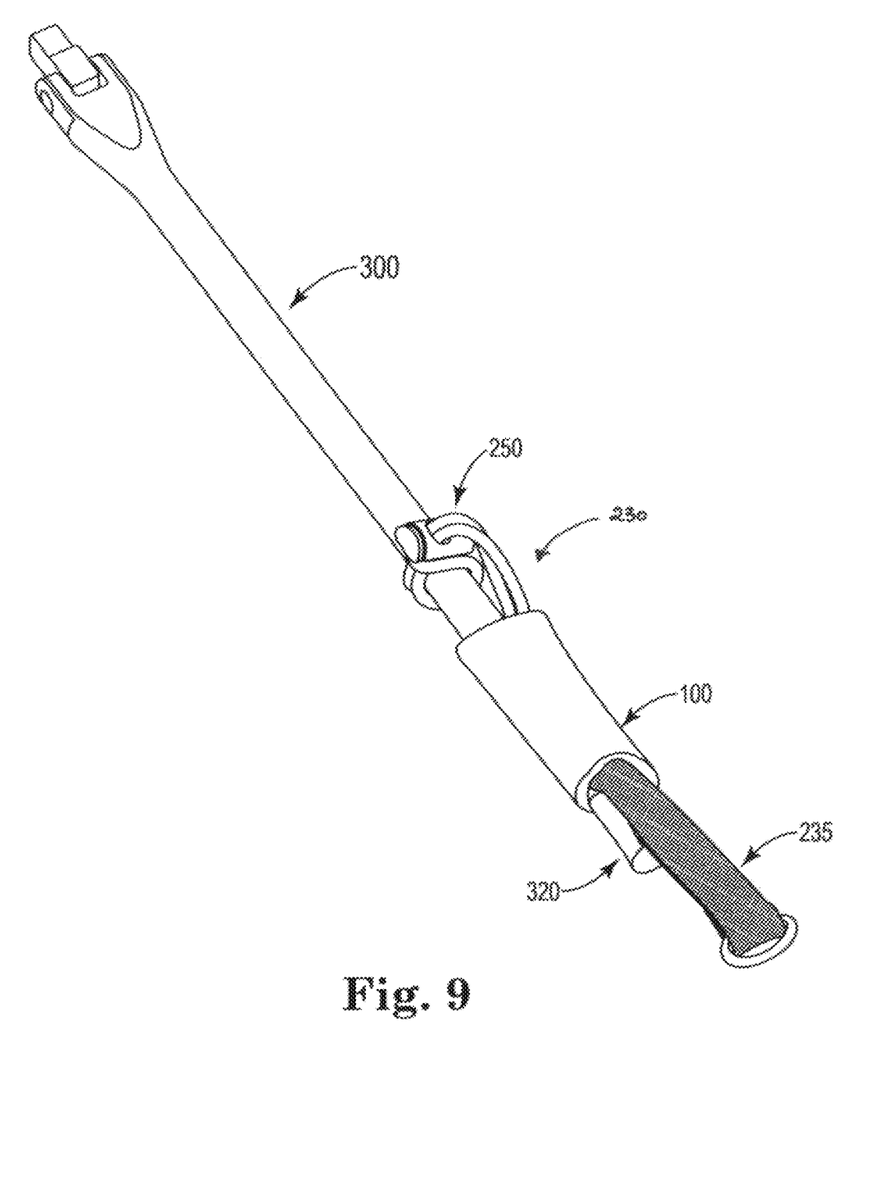
FIG. 9 is a perspective view of a step in the application of the invention to breaker bar 300.

FIG. 9 depicts breaker bar 300, with removable core 150 removed, and elastic sleeve 100 constricted onto handle 320 thereby securing safety strap 230 to breaker bar 300.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. For example, the dimensions and proportions indicated in the figures may be altered without departing from the scope of the invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A kit to attach a safety strap to a hand tool, comprising:
   a removable core defining a volume and having an exterior diameter, an interior diameter, and a length;
   a rubber sleeve stretched onto the removable core, the rubber sleeve having a length and relaxed interior and exterior diameters, wherein the difference between the relaxed interior and exterior diameters define a wall width, and wherein the relaxed interior diameter is 3 to 4 times smaller than the exterior diameter of the removable core upon which the rubber sleeve is stretched, and wherein the ratio of the length of the elastic sleeve in inches to the weight in pounds of the hand tool to which a safety strap is to be attached is between 0.4 and 0.6; and,
   wherein the safety strap is configured on one end to attach to a user of a hand tool, and,
   wherein the safety strap has a length greater than the length of the removable core.

2. The kit of claim 1 wherein the rubber sleeves wall width is between 0.165 and 0.185 inches.

* * * * *